US012737550B2

(12) United States Patent
Mink et al.

(10) Patent No.: US 12,737,550 B2
(45) Date of Patent: Sep. 15, 2026

(54) SYSTEM AND METHOD FOR UNDOING MACHINE LEARNING CAPABILITY INTENT ACTIONS OF AN ARTIFICIAL INTELLIGENCE (AI) PRODUCTIVITY TOOL EXECUTING ON AN INFORMATION HANDLING SYSTEM

(71) Applicant: Dell Products LP, Round Rock, TX (US)

(72) Inventors: Jacob Mink, Cedar Park, TX (US); Srikanth Kondapi, Austin, TX (US); Vlad Rosu, Albestii Pamanteni (RO)

(73) Assignee: DELL PRODUCTS LP, Round Rock, TX (US)

( * ) Notice: Subject to any disclaimer, the term of this patent is extended or adjusted under 35 U.S.C. 154(b) by 163 days.

(21) Appl. No.: 18/788,753

(22) Filed: Jul. 30, 2024

(65) Prior Publication Data

US 2026/0037732 A1 Feb. 5, 2026

(51) Int. Cl.
*G06F 17/27* (2006.01)
*G06F 40/30* (2020.01)

(52) U.S. Cl.
CPC .................................. *G06F 40/30* (2020.01)

(58) Field of Classification Search
CPC ...... G06F 40/30; G06F 16/532; G06F 40/295; G06F 16/51; G06F 16/535
USPC .......................................................... 704/9
See application file for complete search history.

(56) References Cited

U.S. PATENT DOCUMENTS

| | | | |
|---|---|---|---|
| 8,380,714 | B2 | 2/2013 | Inagaki |
| 8,548,951 | B2 | 10/2013 | Solmer |
| 9,201,957 | B2 | 12/2015 | Turdakov |
| 9,218,412 | B2 | 12/2015 | Wang |
| 9,626,358 | B2 | 4/2017 | Danielyan |
| 9,633,085 | B2 | 4/2017 | Kamotsky |
| 9,648,683 | B2 | 5/2017 | Kangyo |
| 10,146,593 | B2 | 12/2018 | Gong |
| 11,620,262 | B2 | 4/2023 | Lee |
| 11,948,073 | B2 | 4/2024 | Zhang |
| 2018/0365065 | A1 | 12/2018 | Guttman |
| 2020/0387550 | A1 | 12/2020 | Cappetta |

(Continued)

FOREIGN PATENT DOCUMENTS

WO 2020/192587 A1 10/2020

*Primary Examiner* — Md S Elahee
(74) *Attorney, Agent, or Firm* — Prol Intellectual Property Law, PLLC; H. Kenneth Prol

(57) ABSTRACT

A system and method of undoing capability intent actions of an artificial intelligence (AI) productivity tool chatbot software application comprising processing a received first user-query input and generating a query intent action, correlating a capability intent action with the user-query inputs by invoking an ML model algorithm to correlate the query intent value to a capability intent value for a capability to be executed by an AI productivity tool-enablable software application as a responsive capability intent action, initiating the capability intent action and identifying a negated intent that describes a reversing action that may be executed to reverse the capability intent action that is correlated to the first user query input, and generating a system state defining the state of the information handing system prior to the capability intent action being executed by the AI productivity tool-enablable software application.

20 Claims, 3 Drawing Sheets

(56) References Cited

U.S. PATENT DOCUMENTS

| | | | |
|---|---|---|---|
| 2020/0394360 | A1 | 12/2020 | Dunn |
| 2021/0216576 | A1 | 7/2021 | Staub |
| 2021/0256207 | A1 | 8/2021 | Dunn |
| 2021/0334194 | A1 | 10/2021 | Xiao |
| 2021/0366506 | A1 | 11/2021 | Han |
| 2021/0374353 | A1 | 12/2021 | Zhang |
| 2022/0035684 | A1 | 2/2022 | Gupte |
| 2022/0035732 | A1 | 2/2022 | Xiao |
| 2022/0092439 | A1 | 3/2022 | Liu |
| 2022/0318502 | A1 | 10/2022 | Howell |
| 2023/0105806 | A1 | 4/2023 | Dunn |
| 2023/0222359 | A1 | 7/2023 | Panikkar |
| 2023/0237263 | A1 | 7/2023 | Howell |
| 2023/0251962 | A1 | 8/2023 | Xiao |
| 2024/0054318 | A1 | 2/2024 | Feltin |
| 2024/0061719 | A1 | 2/2024 | Reddy |
| 2024/0069770 | A1 | 2/2024 | Prabhakar |
| 2024/0069959 | A1 | 2/2024 | Prabhakar |
| 2024/0070113 | A1 | 2/2024 | Prabhakar |
| 2024/0161003 | A1 | 5/2024 | Alexander |
| 2025/0298839 | A1* | 9/2025 | Banerjee ............... G06F 16/532 |

* cited by examiner

SYSTEM AND METHOD FOR UNDOING MACHINE LEARNING CAPABILITY INTENT ACTIONS OF AN ARTIFICIAL INTELLIGENCE (AI) PRODUCTIVITY TOOL EXECUTING ON AN INFORMATION HANDLING SYSTEM

FIELD OF THE DISCLOSURE

The present disclosure generally relates to execution of computer-readable program code instructions for one or more artificial intelligence (AI) productivity tools to identify a capability intent action of a software application for a capability intent action from the AI productivity tool based on received user-query inputs from a user. The present disclosure more specifically relates systems and methods of execution of computer-readable program code instructions for one or more AI productivity tools to identify a capability intent action of one or more AI productivity tool enablable software applications based on received user-query inputs from a user, generate a negated intent that describes a reversing action of a capability that may be completed to reverse the initiated AI productivity capability intent action, and undo the capability intent action based on the negated intent when a subsequent user-query input is received requesting the negation.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may be used to execute instructions of one or more workspace productivity applications for word processing, communications, firmware business operations, gaming applications, or the like. Further, the information handling system may include machine readable code instructions for one or more AI productivity tools that interface with various AI productivity tool-enablable software applications that increase the efficiency of the operation of the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
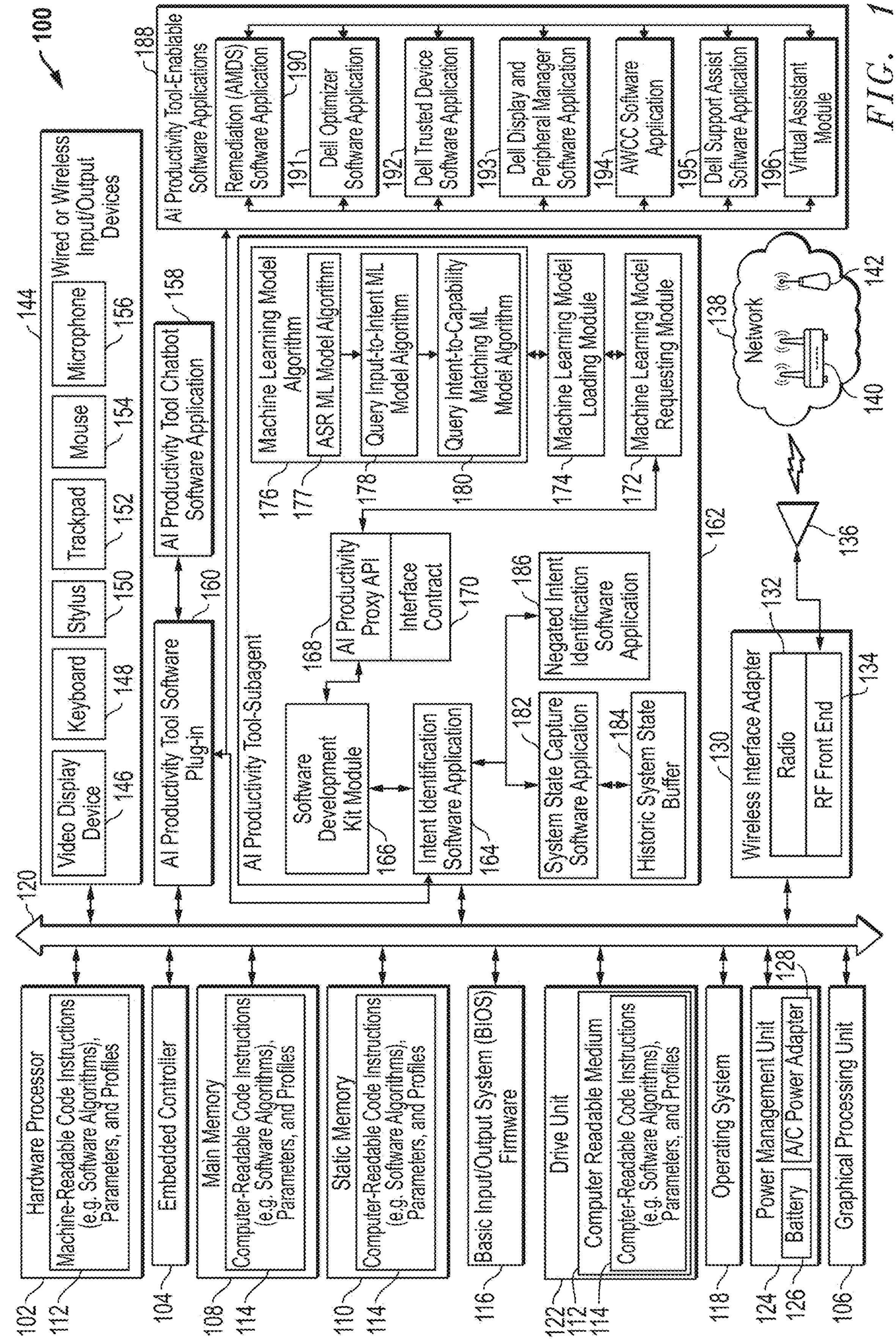
FIG. 1 is a block diagram illustrating an information handling system that includes computer-readable program code instructions of an AI productivity tool to select among a plurality of AI productivity tool-enablable software applications for software services, operations, or responses of a capability intent action responsive to a user query, and generate a negated intent for undoing the action intent according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Artificial intelligence (AI) is a developing technology that is used to increase efficiency of computing systems. AI, such as with use of various machine learning (ML) model algorithms, may be implemented on an information handling system with execution of computer-readable program code instructions of one or more AI productivity tool modules executing with one or more AI productivity tool-enablable applications according to embodiments herein. In some examples, a user-query may be input to an AI productivity tool chatbot software application executing on the information handling system via text input, audio (e.g., speech) input, and the like. This user-query input may be processed for a query intent to change settings or characteristics of the operation of the information handling system that may cause the AI productivity tool modules to carry out these requests and actions. In an embodiment, an intent identification software application may cause any number of ML model algorithms to be executed in order to initially process and determine the user's intent in an embedded query intent value and cause one or more AI productivity tool-enablable software applications to carry out the intended action via a capability of the AI productivity tool-enablable software application according to correlation of that capability's actions with the user-query input and the query intent from the user. However, in the context of these AI productivity tool chatbot software applications, a feature useful to a user may be a capacity to provide subsequent user-query input requesting that a previous capability intent action be undone. For example, a user might erroneously adjust the brightness level of a display, update drivers, or configure the information handling system to, for example, establish a gaming configuration while using the AI productivity tool chatbot software application and systems described herein. Information handling systems executing an AI productivity tool chatbot software application and related software module or software applications, such as with one or more AI productivity tool enablable software applications, need a straightforward method for a user to undo these responses to user-query inputs executed by a capability intent action without manual navigation through various system settings and/or software application settings or memorization as to what settings were previously changed.

The present specification describes embodiments of a system and method for undoing capability intent actions of an AI productivity tool and AI productivity tool-enablable software application as requested by a user using user-query inputs. In an example embodiment, an information handling system may include a hardware processor with the hardware processor to execute computer-readable program code instructions of a software development kit module to initiate a request, on behalf of an AI productivity tool chatbot software application being executed on the information handling system, for an ML model algorithm to identify a capability intent action having a capability intent value having a statistical correlation with a query intent value generated for a received user-query input from a user. The hardware processor may also execute computer-readable program code instructions of an intent identification software application to identify a capability intent action from the user-query inputs by invoking the machine learning (ML) model algorithm to convert the user-query input into an query intent value identifying the intent of the query in a multi-axis vector space and then finding a correlating match to a capability intent value for a capability serviceable by an AI productivity tool-enablable software application as a responsive capability intent action. Even further, the hardware processor may execute computer-readable program code instructions of the AI productivity tool-enablable software application to initiate a capability intent action based on the identified capability that correlates to the user-query input. This process provides for a plurality of user-query inputs to be interpreted by the information handling system to be generated into an embedded query intent values and correlated to corresponding capability intent values for capability intent actions carried out responsive to the user's query inputs (e.g., via text or speech input). Multiple query inputs may be received and capability intent actions performed, and the embodiments of the present specification describe a system and method for undoing any of several capability intent actions of an AI productivity tool chatbot software application and AI productivity tool-enablable software application, even if subsequent capability intent actions have been requested by a user using user-query inputs and executed. The system may undo capability intent actions further back in a queue of capability intent actions that have been performed in embodiments herein.

The systems and methods include the hardware processor executing computer-readable program code instructions of a negated intent identification software application to identify a negated intent associated with a capability intent action for a capability that describes a reversing action that may be completed to reverse the responsive capability intent action initiated in response to a first user-query input. In embodiments herein, each capability intent action of a plurality of executed capability intent actions may have a negated intent generated for it. This negated intent may be later used by a user in requesting that one or more capability intent actions previously carried out via the AI productivity tool chatbot software application or AI productivity tool-enablable software application be easily undone. The systems and methods may also include the hardware processor executing computer-readable program code instructions of a system capture software module to generate a system state defining the state of the information handing system for software, hardware, or firmware updates, settings, policies, or the like captured in information handling system state data from prior to the capability intent action being completed by an AI productivity tool-enablable software application. This system state may be used to define the state of the information handling system for software, hardware, or firmware updates, settings, policies or the like prior to when the first user-query input was received so that the information handling system may be casily returned back to this previous state via the negated intent and a reversing action associated with that negated intent.

In an embodiment, the hardware processor may execute the computer-readable program code instructions of the intent identification software module to receive subsequent user-query inputs describing a user's intention to undo the AI productivity capability intent action and direct the negated intent identification software application to determine that an undo request has been received and to identify the negated intent that describes a reversing action and initiate the reversing action to reverse the corresponding capability intent action via the one or more AI productivity tool-enablable software applications. The negated intent and reversing action are associated with capabilities of the AI productivity tool enablable software applications in a database of capabilities in embodiments herein In an embodiment, the hardware processor may execute computer-readable program code instructions of the system state capture software application to identify the state of the information handing system prior to the AI productivity capability intent action being completed by the AI productivity tool-enablable software application and store this state as described. This state information may be retrieved and the hardware process may execute one or more reverse capability intent actions via the one or more AI productivity tool enablable software applications or the AI productivity tool chatbot software application to place the information handling in the prior system state for relative state information settings, updates, or policies that were altered by the capability intent action or actions. The systems and methods described herein enhance a user's ability to control the capability intent actions carried out by AI productivity tool chatbot software applications on an information handling system with minimal effort on the part of the user to undo previously-initiated capability intent actions. Additionally, the systems and methods described herein create a user-intuitive interaction with the AI productivity tools thereby allowing the user to confidently interact with the information handling system assured that the user's resulting capability intent actions are reversible, consistent, and efficient in most cases. Some capability intent actions, such as a delete operation, may however not be available to be undone and notice may be provided to a user.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 140, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 108, (volatile (e.g., random-access memory, etc.), or static memory 110, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, a neural processing unit (NPU), an audio processing unit (APU), or any combination thereof. It is appreciated that the information handling system 100 may include any number of hardware processing devices described herein. Computer readable code instructions stored in main memory 108 (e.g., RAM) quickly accessible by hardware processing resources using that main memory 108. Computer-readable program code instructions stored in static memory 110, main memory 108, or drive unit 122 may be "cold" and latency may be involved in invoking such computer-readable program code instructions to main memory 108 according to embodiments herein. Additional components of the information handling system 100 may include one or more storage devices such as static memory 110 or drive unit 122. The information handling system 100 may include or interface with one or more communications ports for communicating with external devices, as well as various input and output (I/O) devices 144, such as a mouse 154, a trackpad 152, a stylus 150, a keyboard 148, a video/graphics display device 146, a microphone 194, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 114 that may operate on servers or systems, remote data centers, or on-box in individual client information handling systems according to various embodiments herein. In some embodiments, it is understood any or all portions of instructions (e.g., software algorithms), parameters, and profiles 114 may operate on a plurality of information handling systems 100.

The information handling system 100 may include the hardware processor 102 such as a central processing unit (CPU) or other hardware processing resources. Any of the hardware processing resources may operate to execute code that is either firmware or software code. Moreover, the information handling system 100 may include memory such as main memory 108, static memory 110, and disk drive unit 122 (volatile (e.g., random-access memory, etc.), nonvolatile memory (read-only memory, flash memory etc.) or any combination thereof or other memory with computer readable medium 112 storing instructions (e.g., software algorithms), parameters, and profiles 114 executable by the hardware processor 102 (e.g., central processing unit), NPU, APU, EC 104, GPU 106, or any other hardware processing device. The information handling system 100 may also include one or more buses 120 operable to transmit communications between the various hardware components such as any combination of various I/O devices 144 as well as between hardware processors 102, an EC 104, the operating system (OS) 118, the basic input/output system (BIOS) 116, the wireless interface adapter 130, or a radio module, among other components described herein. In an embodiment, the hardware processor 102, EC 104, and/or GPU 106, NPU, APU may execute one or more bus drivers in order to transmit this data between the information handling system 100 and the input/output devices 144 described herein. In an embodiment, the information handling system 100 may be in wired or wireless communication with the I/O devices 144 such a keyboard 148, a mouse 154, video display device 146, stylus 150, trackpad 152, microphone 194, among other peripheral devices.

In an embodiment, the information handling system 100 further includes a video/graphics display device 146. The video/graphics display device 146 in an embodiment may function as a liquid crystal display (LCD), an organic light emitting diode (OLED), a flat panel display, or a solid-state display. It is appreciated that the video/graphics display device 146 may be wired or wireless and may be an external video/graphics display device 146 that allows a user to increase the desktop area by extending the desktop in an embodiment. Additionally, as described herein, the information handling system 100 may include or be operatively coupled to a cursor control device (e.g., a trackpad 152, or gesture or touch screen input), a stylus 150, and/or a keyboard 148, among others that allows the user to interface with the information handling system 100 via the video/graphics display device 146. Information handling system 100 may also be operatively coupled to a wired or wireless input/output device 144 or other hardware devices that may include a hardware processing device such as a hardware processor, microcontroller, or other hardware processing resource. Various drivers and hardware control device electronics may be operatively coupled to operate the I/O devices 144 according to the embodiments described herein. The present specification contemplates that the I/O devices 144 may be wired or wireless.

A network interface device of the information handling system 100 may be wired or wireless such as shown with wireless interface adapter 130 that can provide wireless connectivity among devices such as with Bluetooth® or to a network 138, e.g., a wide area network (WAN), a local area network (LAN), wireless local area network (WLAN), a wireless personal area network (WPAN), a wireless wide area network (WWAN), or other network. In embodiments described herein, the wireless interface device 130 with its radio 132, RF front end 134 and antenna 136 is used to communicate with the wireless peripheral devices, via, for example, a Bluetooth® or Bluetooth® Low Energy (BLE) protocols or any proprietary RF protocol such as those may utilize similar frequency ranges but proprietary modulation and data transmission characteristics. In embodiments, Bluetooth®, BLE, proprietary RF protocol, or other WPAN or WLAN protocols and plural such protocols may be used for communication with and among any wireless peripheral device to be paired or paired with the information handling system 100 or other information handling systems.

In other embodiments, a WAN, WWAN, LAN, and WLAN may each include an AP 140 or base station 142 used to operatively couple the information handling system 100 to a network 138 via a wireless interface adapter 130. In a specific embodiment, the network 138 may include macro-cellular connections via one or more base stations 142 or a wireless AP 140 (e.g., Wi-Fi), or such as through licensed or unlicensed WWAN small cell base stations 142. Connectivity may be via wired or wireless connection. For example, wireless network wireless APs 140 or base stations 142 may be operatively connected to the information handling system 100. Wireless interface adapter 130 may include one or more RF (RF) subsystems (e.g., radio 132) with transmitter/receiver circuitry, modern circuitry, one or more antenna RF (RF) front end circuits 134, one or more wireless controller circuits, amplifiers, antennas 136 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHZ)), IEEE 802.15 WPAN standards, WWAN such as 3GPP or 3GPP2, Bluetooth® standards, proprietary RF protocol, or similar wireless standards may be used. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, a hardware processing resource executing computer-readable program code instructions of software, or firmware, or dedicated hardware implementations such as application specific integrated circuits, programmable logic arrays and other hardware devices may be constructed to implement one or more of some systems and methods described herein. The apparatus and systems of various embodiments may broadly include a variety of electronic and computer systems such as one or a plurality of information handling systems 100 herein. One or more embodiments described herein may implement functions using two or more specific interconnected hardware devices with related control and data signals that may be communicated between and through the modules, or as portions of an application-specific integrated circuit. Accordingly, the present system encompasses a hardware processing resource executing computer-readable program code instructions of software or firmware as well as hardware implementations or any combination.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable program code instructions, parameters, and profiles 114 or receives and executes computer-readable program code instructions, parameters, and profiles 114 responsive to a propagated signal, so that a hardware device connected to a network 138 may communicate voice, video, or data over the network 138. Further, the computer-readable program code instructions, parameters, and profiles114 may be transmitted or received over the network 138 via the network interface device or wireless interface adapter 130.

The information handling system 100 may include a set of computer-readable program code instructions, parameters, and profiles 114 that may be executed to cause the computer system to perform any one or more of the methods or computer-based functions disclosed herein. For example, computer-readable program code instructions, parameters, and profiles 114 may be executed by a hardware processor 102, GPU 106, EC 104 or any other hardware processing resource and may include software agents, or other aspects or components used to execute the methods and systems described herein. Various software modules comprising application computer-readable program code instructions, parameters, and profiles 114 may be coordinated by an OS 118, and/or via an application programming interface (API) include a unified device API described herein. An example OS 118 may include Windows®, Android®, and other OS types. Example APIs may include Win 32, Core Java API, or Android APIs.

In an embodiment, the information handling system 100 may include a disk drive unit 122. The disk drive unit 122 and may include computer-readable program code instructions, parameters, and profiles 114 in which one or more sets of computer-readable program code instructions, parameters, and profiles 114 such as firmware or software can be embedded to be executed by the hardware processor 102 (e.g., CPU) or other hardware processing devices such as a GPU 106, an EC 104, an NPU, an APU, or other microcontroller unit to perform the processes described herein. Similarly, main memory 108 and static memory 110 may also contain a computer-readable medium for storage of one or more sets of computer-readable program code instructions, parameters, or profiles 114 described herein. The disk drive unit 122 or static memory 110 also contain space for data storage. Further, the computer-readable program code instructions, parameters, and profiles 114 may embody one or more of the methods as described herein. In a particular embodiment, the computer-readable program code instructions, parameters, and profiles 114 may reside completely, or at least partially, within the main memory 108, the static memory 110, and/or within the disk drive 122 during execution by the hardware processor 102, EC 104, or GPU 106 of information handling system 100.

Main memory 108 or other memory of the embodiments described herein may contain computer-readable medium (not shown), such as RAM in an example embodiment. An example of main memory 108 includes random access memory (RAM) such as static RAM (SRAM), dynamic RAM (DRAM), non-volatile RAM (NV-RAM), or the like, read only memory (ROM), another type of memory, or a combination thereof. Static memory 110 may contain computer-readable medium (not shown), such as NOR or NAND flash memory in some example embodiments. The applications and associated APIs, for example, may be stored in static memory 110 or on the disk drive unit 122 that may include access to a computer-readable program code instructions, parameters, and profiles 114 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of computer-readable program code instructions. The term "computer-readable medium" shall also include any medium that is capable of storing, encoding, or carrying a set of computer-readable program code instructions for execution by a processor or that cause a computer system to perform any one or more of the methods or operations disclosed herein.

In an embodiment, the information handling system 100 may further include a power management unit (PMU) 124 (a.k.a. a power supply unit (PSU)). The PMU 124 may include a hardware controller and executable computer-readable program code instructions to manage the power provided to the components of the information handling system 100 such as the hardware processor 102 and other hardware components described herein. The PMU 124 may control power to one or more components including the one or more drive units 122, the hardware processor 102 (e.g., CPU), the EC 104, the GPU 106, a video/graphic display device 146, or other wired I/O devices 144 such as the mouse 154, the stylus 150, the keyboard 148, and the trackpad 152 and other components that may require power when a power button has been actuated by a user. In an embodiment, the PMU 124 may monitor power levels and be electrically coupled to the information handling system 100 to provide this power. The PMU 124 may be coupled to the bus 120 to provide or receive data or computer-readable program code instructions. The PMU 124 may regulate power from a power source such as the battery 126 or AC power adapter 128. In an embodiment, the battery 126 may be charged via the AC power adapter 128 and provide power to the components of the information handling system 100, via wired connections as applicable, or when AC power from the AC power adapter 128 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or computer-readable program code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described in embodiments herein, the information handling system 100 includes an AI productivity tool such as an AI productivity tool chatbot software application 158. In an embodiment, the AI productivity tool software chatbot application 158 may be any chatbot application that can receive input from a user such as text input via the keyboard 148 or speech input via the microphone 156 for example. In an embodiment, the AI productivity tool software chatbot application 158 may include a virtual assistant-type AI software agent. In various embodiments, the hardware processor 102 or other alternative hardware processing resources of the information handling system 100 may execute computer-readable program code instructions of the AI productivity tool software chatbot application 158 with its AI productivity tool software plug-in 160 and monitor for user-query input at a microphone 156, keyboard 148, or other input device for the AI productivity tool subagent 162 to engage in determining AI productivity capability intent actions responsive to the user-query input. In an embodiment, the AI productivity tool software chatbot application 158 may include a proprietary AI productivity tool software chatbot application 158 of a manufacturer of an information handling system 100 or may be a third-party AI productivity tool software chatbot application 158 such as Cortana® by Microsoft®, Copilot® by Microsoft®, Siri® by Apple® Inc., Gemini® by Google AIR, ChatGPT® by OpenAI®, and Amazon Alexa® by Amazon®, among others or some combination. In an embodiment, the AI productivity tool software plug-in 160 may be used to interface between the AI productivity tool software chatbot application 158 and an AI productivity tool subagent 162 executed on the information handling system 100. This AI productivity tool software plug-in 160 may be used by one or more of the AI productivity tool-enablable software applications 188 and other software applications (e.g., Microsoft® Word®, Microsoft®

Outlook®, Gmail®, Microsoft® Excel®, Google® Chrome®, Microsoft® Edge®, etc.) to interface with the AI productivity tool software chatbot application 158 as well.

The AI productivity tool subagent 162 may include any artificial intelligence-based AI productivity tools used to assist in interface and execution of one or more AI productivity tool-enablable software applications 188 for receiving and processing user-query inputs from a user of an information handling system 100. The execution of the computer-readable program code instructions associated with the AI productivity tool subagent 162 and its modules, software applications, and algorithms provides responsive actions, software services, or other responses from the information handling system 100 to the user-query input. In an embodiment, the AI productivity tool software plug-in 160 includes computer-readable program code instructions of an intent identification software application 164 and may be operatively coupled to the AI productivity tool software plug-in 160 in order to initially receive the user-query inputs described herein.

In an embodiment, the AI productivity tool subagent 162 may be any software and/or firmware executable by the hardware processor 102 of the information handling system 100 that also interfaces with one or more of a plurality of the AI productivity tool-enablable software applications 188 (such as a remediation (AMDS) software application 190, Dell® Optimizer® software application 191, Dell® Trusted Device® software application 192, Dell® Display and Peripheral Manager® software application 193, Alienware® Command Center (AWCC) software application 194, Dell® Support Assist® software application 195, and a virtual assistant module 196) to access AI enabled capabilities within those AI productivity tool-enablable software applications (e.g., 190, 191, 192, 193, 194, 195, 196) for responsive operations, functions, software services, or responses to user-query inputs. In an embodiment, the computer-readable program code instructions of the software applications (e.g., AI productivity tool-enablable software applications 188 such as software 190, 191, 192, 193, 194, 195, 196) and modules described herein may operate wholly "on-box" within the information handling system 100 or be sub-agents on-box for interfacing with remote software systems executing at remote server locations. In an embodiment, the AI productivity tool subagent 162 may be used to direct the execution of various modules in support of the AI productivity tool-enablable software applications 188 described herein. Additionally, the AI productivity tool subagent 162 may be provided with access to the BIOS, OS, driver software, and hardware devices of the information handling system 100 as well as data for responses or remote database access in some cases to conduct the AI productivity capability intent actions pursuant to the user-query input from the user provided at the AI productivity tool subagent 162. As shown in FIG. 1, examples of AI productivity tool-enablable software application 188 may include, for example, Dell® Trusted Device® software application 192, a remediation Dell® APEX Managed Device Service (AMDS)® software application 190, Alienware Command Center (AWCC)® software application 194, Dell® Optimizer® software application 191, Dell® Display and Peripheral Manager software application 193, and a virtual assistant module 196, among others.

In an embodiment, the hardware processor 102 or other hardware processing resource (e.g., EC 104, GPU 106, APU, or NPU) may execute computer-readable program code instructions of the intent identification software application 164. The intent identification software application 164 may engage with a machine learning model requesting module 172 to have one or more machine learning (ML) model algorithms 176 loaded and executed on the hardware processor in order to, initially, determine the capability intent action to be conducted based on the received user-query inputs. Determining a responsive capability intent action occurs during execution of computer-readable program code instructions of the query intent-to-capability matching ML model algorithm 180 for statistical or other correlation of an embedded query intent vector value with a capability intent value for a capability of an AI productivity tool-enablable software application 188. Further, the execution of the computer-readable program code instructions of the intent identification software application 164 may call a software development kit (SDK) module 166. The SDK module 166 may include any computer-readable program code instructions that is executed by the hardware processor 102 or other hardware processing resource to request that a ML model algorithm 176 be invoked to support an identification of, in an embodiment, a capability intent action based on received user-query inputs from a user. For example, the ML model algorithm 176 may include an automatic speech recognition (ASR) ML model algorithm 177 for detecting speech in an audio input and converting that speech to text in some embodiments. An ML model algorithm 176 may include a query input-to-intent embedding ML model algorithm 178 that receives the user-query inputs in a text form which identifies a user intent of the user-query inputs text, and assign and embeds a multi-axis vector query intent value to the identified user intent. The ML model algorithm 176 may also include a query intent-to-capability matching ML model algorithm 180 that receives the assigned multi-axis vector query intent value as input and matches the assigned multi-axis vector query intent value to a capability intent value associated with the AI productivity tool-enablable software application 188 that can execute the capability intent action. These and other ML model algorithms 176 may similarly be accessed by execution of code instructions of capabilities of AI productivity tool-enablable software applications 188 to perform responsive AI productivity capability actions in response to user-query inputs in other embodiments herein.

It is appreciated that execution of computer-readable program code instructions of the selected ML model algorithms 176 must satisfy an interface contract 170 requested by the intent identification software application 164 for the execution of the ML model algorithm such that the query intent value from the user-query inputs may be interpreted and an available capability associated with one of the plurality of AI productivity tool-enablable software applications 188 can be statistically correlated to the query intent value of the user-query input from the user, and the capability executed as a responsive capability intent action in embodiments herein. The interface contract 170 described herein defines the requirements that selected ML model algorithms 176 are to have in order to be able receive a specific type of input from the intent identification software application 164 or any AI productivity tool-enablable software application 188 and to provide a specific type of output to the intent identification software application 164 and/or AI productivity tool-enablable software applications 188. In an embodiment, the interface contract 170 is generated by an AI productivity proxy API 168 invoked by the SDK module 166 in order to identify the specific ML model algorithm 176 (e.g., 178, 180) that provides the appropriate inputs or outputs to the intent identification software application 164 or AI productivity tool-enablable software application 188.

By way of example, a user may provide audio input to the information handling system (via for example the microphone 156) as this user-query input to the AI productivity tool software chatbot application 158. The user may state, for example, "Set my display_brightness to 75%." This causes the AI productivity tool software chatbot application 158 to transmit this audio user-query input to the intent identification software application 164 via the AI productivity tool software plug-in 160. The intent identification software application 164 may then call the SDK module 166 and have the AI productivity proxy API 168 to generate an interface contract 170 used to select among the plurality of ML model algorithms 176 to determine the user's embedded query intent value and identify an AI productivity tool-enablable software application 188 that includes a capability that can satisfy that user-query input and its intent. To do this, the AI productivity proxy API 168 may access a machine learning model requesting module 172 and machine learning model loading module 174 to select the appropriate ML model algorithms 176 and load those machine learning model algorithms 176 (e.g., an automatic speech recognition (ASR) ML embedded algorithm 177, the query input-to-intent embedding ML model algorithm 178 and query intent-to-capability matching ML model algorithm 180) to RAM for execution. At this point, the output from the executed ML model algorithm 176 may be provided to the intent identification software application 164, provide an identified query intent (e.g., "SET_DISPLAY_BRIGHTNESS_TO_PERCENTAGE") including an embedded vectorized query intent value, and suggest one of the plurality of AI productivity tool-enablable software applications 188 and a capability for the AI productivity tool-enablable software applications 188 having a correlated capability intent value to satisfy the user request to change the brightness of the display such as with the Dell® Display and Peripheral Manager® software application 193. An example capability intent may include a capability description such as "DISPLAY_BRIGHTNESS_SETTING_CONTROL" which may have a generated vector capability intent value so a correlation may be made with an identified query intent in embodiments herein.

In an embodiment, the intent identification software application 164 may cause computer-readable program code instructions of a negated intent identification software application 186 to be executed in order to identify a negated intent, previously associated with a capability in an available capabilities database, that describes a reversing action for the capability intent action that may be completed by an AI productivity tool software chatbot application 158, AI productivity tool subagent 162, or one or more AI productivity tool-enablable software applications 188 such as Dell® Display and Peripheral Manager® software application 193. This negated intent may be later used to reverse the initiated AI productivity capability intent action. Following with the example, an example negated intent may include "SET_DISPLAY_BRIGHTNESS_TO_PERCENTAGE" that is the percentage of the previous display state prior to the execution of the capability intent action by the Dell® Display and Peripheral Manager® software application 193. This negated intent may be maintained within a historic system state buffer 184 within a circular buffer in an example embodiment or may be associated with the intent action as a negated intent in a capabilities databases on a memory device, such as a static memory 110 of the information handling system 100. It is appreciated that each of the negated intents are a priori assigned to each of the capability intent actions capable of being effectuated by the systems and methods described herein. Thus, when a user if the information handling system attempts to undo a capability intent action that can be negated, the negated intent may be identified (e.g., in a negation field associated with data of the capability intent action) and apply the reversing action of the negated intent.

The circular buffer of the historic system state buffer 184 may operate under a first in, first out (FIFO) logic such that the oldest negated intent stored thereon may be removed first within the circular buffer when the circular buffer is full. Thus, in an embodiment, the circular buffer may store any number of negated intents that may be used to reverse the original capability intent action (e.g., Set my display brightness to 75%) to a negated intent (e.g., set my display brightness to 100% or some previous percentage). The size of the circular buffer may be relatively small due to the potential of the user to not remember all previous user-query inputs except for the most recent. In one embodiment, the circular buffer of the historic system state buffer 184 may store up to five system states although any number of system states are contemplated in various embodiments. In this way, plural capability intent actions may be performed in response to plural user-query inputs and an undo query input may still be performed by a negated intent and reversing action on prior capability intent actions back until the FIFO buffer size has caused them to be dropped and deleted in embodiments herein.

The hardware processor 102 or other hardware processing resource (e.g., embedded controller 104, GPU 106, APU, NPU) may also execute computer-readable program code instructions of a system state capture software module 182. In an embodiment, the execution of the system state capture software module 182 may generate a system state defining the state of the information handing system 100 prior to the AI productivity capability intent action being completed by the AI productivity tool-enablable software application 188. In this example embodiment, the AI productivity tool-enablable software application 188 is the Dell® Display and Peripheral Manager® software application 193 that, per the user-query inputs, will reduce the brightness of the display device to 75% as requested by the user from a previous display brightness level that is set to a lower or higher percentage value. However, prior to the Dell® Display and Peripheral Manager® software application 193 changing the brightness of the display device the execution of the computer-readable program code instructions of the system state capture software module 182 may capture the system state prior to this change (e.g., brightness was set to a 100% level or 50% level or another brightness level).

It is appreciated that during operation of the information handling system 100, the user may not like the changes made to the information handling system as requested in a previous user-query input. Continuing with the example presented above, the user may not appreciate the brightness of the display device (e.g., video display device 146) being at 75% and may request the previous change by the AI productivity capability intent action to be undone. For example, the user may, via the microphone 156, provide audio user-query input to the AI productivity tool software chatbot application 158 such as "Undo my display brightness change." Similar to the above, this new user-query input is received by the intent identification software application 164 from the AI productivity tool software chatbot application 158 via the AI productivity tool software plug-in 160. The intent identification software application 164 may begin to run similar ML model algorithms 176 in order to process the user-query input for a query intent value and identify a correlated capability intent action to be carried out. However, at this point the output from the ML model algorithms 176 (e.g., query input-to-intent embedding ML model algorithm 178 and query intent-to-capability matching ML model algorithm 180) may identify an undo action for a previously executed user-query input and resulting capability intent action that was saved as a negated intent on the historic system state buffer 184. The hardware processor execution computer readable code instructions of intent identification software application 164 may work to identify the negated intent stored in the historic system state buffer 184, if available, to reverse the capability intent action. Thus, in an embodiment, with each user-query input being used as input to the ML model algorithms 176, the undo natural language text or intent and the previous capability intent action and are associated with an undo request and with the negated intent that is linked with a capability and its capability intent action. The negated intent identification software application 186 and ML algorithm 176 then identify the negated intent and reversing action as output if this new or subsequent user-query input is an undo intent for invoking a negated intent for reversing a previous capability intent action that was carried out earlier in embodiments herein.

In an embodiment where the user-query input includes words such as "undo," "negate," "reverse," and the like, the output from these ML model algorithms 176 will identify an undo intent in the subsequent user-query input and proceed to cause the intent identification software application 164 to begin to search the historic system state buffer 184 for a recent capability intent action and a system state that was associated with a capability intent action that is correlated to the subsequent user query input. Then the negated intent action previously linked with that capability or capability intent action is identified via execution of the computer-readable program code of the negated intent identification software application 186 and an associated reversing action is also identified. Thus, in an embodiment, each capability intent action that could be identified via execution of the intent identification software application 164 will have one or more correlating negated intent actions associated with it in order to provide a negated intent reversing action when a user requests that a still-buffered capability intent action now be undone. This assumes the capability intent action can be undone. Some capability actions cannot be undone and designation as such may also be linked to the capability intent action in a capabilities database in other embodiments.

At this point, the negated intent is identified with an associated previous system state that was also stored on the historic system state buffer 184 or a pointer was stored on the buffer pointing to a memory location at another storage device such as a solid state drive having prior state information. The intent identification software application 164 may then execute computer-readable program code instructions of an AI productivity tool-enablable software application 188 (e.g., in this example the Dell® Display and Peripheral Manager® software application 193) to adjust the brightness of the video display device 146 according to the saved system state identified by the negated intent to return the state of the video display device 146 to a brightness level of the video display device 146 prior to the change by the capability intent action. It is appreciated that this process may be completed for other types of changes made to any setting, characteristic, or state of the information handling system 100 and the present specification contemplates that the systems and methods described in embodiments herein may be used by a user to initially make changes to a setting, characteristic, or state of the information handling system 100 and subsequently undo that change. The systems and methods described in embodiments herein enhance a user's ability to control the capability intent actions carried out by AI productivity tools, such as the AI productivity tool chatbot software application 158, on an information handling system 100 by minimizing effort on the part of the user to undo previously-initiated actions. Additionally, the systems and methods described herein and creates a user-intuitive interaction with the AI productivity tools thereby allowing the user to confidently interact with the information handling system 100 assured that the user's capability intent actions are reversible, consistent, and efficient when those capability intent actions are reversable actions and still available in the historical system state buffer 184.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a standalone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
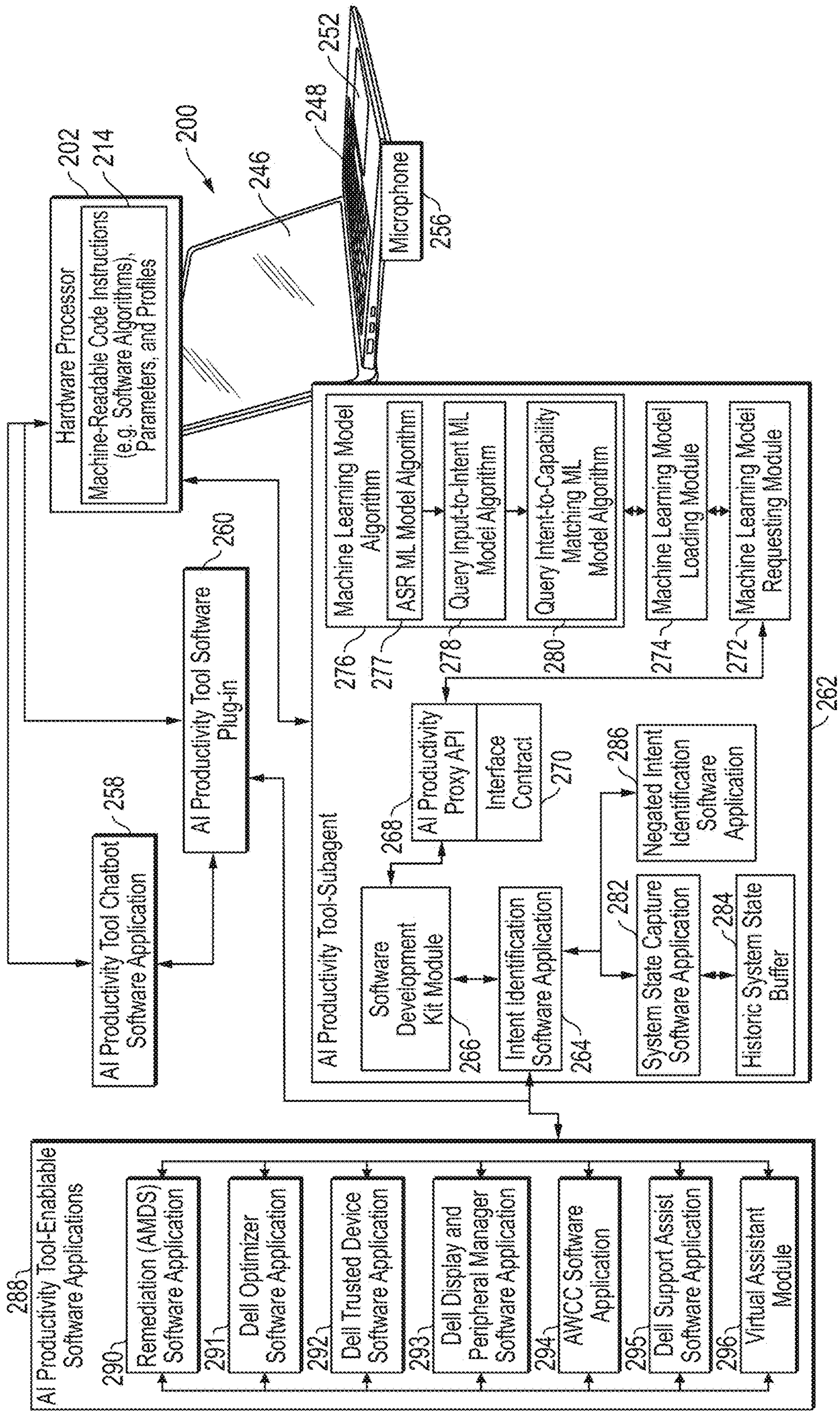
FIG. 2 is a graphic and block diagram illustrating an information handling system that includes computer-readable program code instructions an AI productivity tool subagent and an intent identification software application to select among a plurality of AI productivity tool-enablable software applications for software services, operations, or responses, responsive to an input query for a capability intent action and generate a negated intent for undoing the capability intent action according to another embodiment of the present disclosure.

FIG. 2 is a graphic and block diagram illustrating an information handling system 200 that includes computer-readable program code instructions of an AI productivity tool subagent 262 and an intent identification software application 264 to select among a plurality of AI productivity tool-enablable software applications 288 for software services, operations, for a responsive AI productivity capability intent action and generate a negated intent for undoing the AI productivity capability intent action according to an embodiment of the present disclosure. In further embodiments, information handling system 200 that includes computer-readable program code instructions of an AI productivity tool subagent 262 and an intent identification software application 264 to determine if a user-query input is received with a query intent that is an undo query for a performed capacity intent action, identifying a negated intent corresponding to the capacity intent action to be undone, and executing an associated reversing action to set one or more hardware or software system setting, updates, policies, or other features to a state that existed before execution of the capacity intent action was performed. As described herein, computer-readable program code instructions of the AI productivity tool subagent 262 and an intent identification software application 264 may be executed by a hardware processor 202 on the information handling system 200 thereby allowing the methods described herein to be carried out on-the-box or with access, via a wired or wireless connection, to a server maintained on a network. In embodiments, some modules, databases, and/or processing resources may be maintained on a remote server such that a wired or wireless connection can be made with these remote servers and the method may be implemented as described herein.

In FIG. 2, the information handling system 200 is shown as a laptop-type information handling system 200. However, the present specification contemplates that the information handling system 200 may be any type of information handling system as described herein. The information handling system 200 in FIG. 2 includes a video display device 246 used to provide output to the user. The information handling system 200 further includes a keyboard 248 and a trackpad 252 used by the user to provide input to the information handling system 200. It is appreciated that this input from the user may be received from the user using any device including the microphone 256, the trackpad 252, and the keyboard 246. In the example embodiments described herein, a hardware processor of the information handling system 200 executes computer-readable program code instructions of an AI productivity tool chatbot software application 258 to receive these user-query inputs on behalf of the intent identification software application 264.

As described in embodiments herein, the information handling system 200 includes the computer-readable program code instructions of the AI productivity tool chatbot software application 258 and may be any chatbot application that can receive user-query input from a user such as text input via the keyboard 248 or speech input via the microphone 256. In an embodiment, the AI productivity tool software chatbot application 258 may include a virtual assistant-type AI software agent. In various embodiments, the hardware processor 202 or other alternative hardware processing resources of the information handling system 200 may execute computer-readable program code instructions of the AI productivity tool software chatbot application 258 with its AI productivity tool software plug-in 260 and monitor for user-query inputs at a microphone 256, keyboard 248, or other input device for the AI productivity tool subagent 262 to determine and engage in AI productivity capability intent actions pursuant to the user-query inputs or reversing actions to user-query inputs determined to be an undo query request. In an embodiment, the AI productivity tool software chatbot application 258 may include a proprietary AI productivity tool software chatbot application 258 or may be a third-party AI productivity tool software chatbot application 258 of a manufacturer of the information handling system 200 such as Cortana® by Microsoft®, Copilot® by Microsoft®, Siri® by Apple® Inc., Gemini® by Google AIR, ChatGPT® by OpenAI®, and Amazon Alexa® by Amazon®, among others. In an embodiment, the AI productivity tool software plug-in 260 may be used to interface between the AI productivity tool software chatbot application 258 and an AI productivity tool subagent 262 as well as one or more AI productivity tool enablable software applications 288 having one or more executable capabilities executed on the information handling system 200. This AI productivity tool software plug-in 260 may be used by one or more of the AI productivity tool-enablable software applications 288 and other software applications (e.g., Microsoft® Word®, Microsoft® Outlook®, Gmail®, Microsoft® Excel®, Google® Chrome®, Microsoft® Edge®, etc.) to interface with the AI productivity tool software chatbot application 258.

The AI productivity tool subagent 262 may include any artificial intelligence-based productivity tools used to assist in interface and execution of one or more AI productivity tool-enablable software applications 288 for selection and execution of capabilities responsive to user-query inputs from a user of an information handling system 200. The execution of the computer-readable program code instructions associated with the AI productivity tool subagent 262 and its modules, software applications, and algorithms provides responsive AI productivity capability intent actions such as, software services, hardware operations, or other responses from the information handling system 200 to the user. In an embodiment, the AI productivity tool software plug-in 260 includes computer-readable program code instructions of an intent identification software application 264 and may be operatively coupled to the AI productivity tool software plug-in 260 in order to initially receive the user-query inputs described herein. In an embodiment, the AI productivity tool subagent 262 may be any software and/or firmware executable by the hardware processor 202 of the information handling system 200 that also interfaces with one or more of a plurality of the AI productivity tool-enablable software applications 288 (such as a remediation (AMDS) software application 290, Dell® Optimizer® software application 291, Dell® Trusted Device® software application 292, Dell® Display and Peripheral Manager® software application 293, Alienware® Command Center (AWCC) software application 294, Dell® Support Assist® software application 295, and a virtual assistant module 296) to provide selection among plural AI enabled capabilities within those AI productivity tool-enablable software applications (e.g., 290, 291, 292, 293, 294, 295, 296) for responsive operations, functions, software services, or responses to user-query inputs. In an embodiment, the computer-readable program code instructions of the software applications (e.g., AI productivity tool-enablable software applications 288, 290, 291, 292, 293, 294, 295, 296) and modules described herein may operate wholly "on-box" within the information handling system 200 or be sub-agents on-box for interfacing with remote software systems executing at remote server locations. In an embodiment, the AI productivity tool subagent 262 may be used to direct the execution of various modules in support of the AI productivity tool-enablable software applications 288 described herein. Additionally, the AI productivity tool subagent 262 may be provided with access to the BIOS, OS, driver software, hardware devices and various data regarding the information handling system, user, software or other systems of the information handling system 200 to conduct the AI productivity capability intent actions pursuant to the user-query inputs from the user and provided at the AI productivity tool software chatbot application 258 and to the AI productivity tool subagent 262. As shown in FIG. 2, examples of AI productivity tool-enablable software application 288 may include, for example, Dell® Trusted Device® software application 292, a remediation Dell® APEX Managed Device Service (AMDS)® software application 290, Alienware Command Center (AWCC)® software application 294, Dell® Optimizer® software application 291, Dell® Display and Peripheral Manager software application 293, and a virtual assistant module 296, among others.

In an embodiment, the hardware processor 202 or other hardware processing resource (e.g., EC, GPU, APU, or NPU) executes computer-readable program code instructions of the intent identification software application 264. The intent identification software application 264 may engage with a machine learning model requesting module 272 to have one or more machine learning (ML) model algorithms 276 loaded and executed on the hardware processor in order to, initially, determine the capability intent action to be conducted based on the received user-query inputs. Determining the capability intent action occurs during execution of computer-readable program code instructions of the query intent-to-capability matching ML model algorithm 280 for correlation of an embedded query intent vector value with a capability intent value for a capability of an AI productivity tool-enablable software application 288. The execution of the computer-readable program code instructions of the intent identification software application 264 may call a software development kit (SDK) module 266. The SDK module 266 may include any computer-readable program code instructions that is executed by the hardware processor 202 or other hardware processing resource to request that a ML model algorithm 276 be invoked to support an identification of, in an embodiment, a capability intent action based on received user-query inputs from a user. In an example embodiment, the ML model algorithm 276 is an ASR model algorithm 277 may detect audio input and determine speech inputs of a user-query input and convert that speech input to text. In another example embodiment, the ML model algorithm 276 may include a query input-to-intent embedding ML model algorithm 278 that receives the user-query inputs, identifies a user intent of the user-query inputs, and assign and embeds a multi-axis vector query intent value to the identified user intent. The ML model algorithm 276 may also include an query intent-to-capability matching ML model algorithm 280 that receives the assigned multi-axis vector query intent value as input and matches, through statistical or other correlation, the assigned multi-axis vector query intent value to a capability intent value associated with a capability for the AI productivity tool-enablable software application 288 that can execute the capability intent action.

It is appreciated that execution of computer-readable program code instructions of the selected ML model algorithms 276 a required to satisfy an interface contract 270 requested by the intent identification software application 264 for executing processing of the query intent value from the user-query inputs and correlation to an available capability associated with one of the plurality of AI productivity tool-enablable software applications 288 in embodiments herein. The interface contract 270 may specify inputs and outputs that can be used to process a query input, statistically correlate to the query intent value of the user-query input from the user to a capability, or support execution of a capability intent action of a capability as various required inputs and outputs to ML model algorithms requested and utilized for determining a capacity and executing it by an AI productivity tool enablable software application 288. The interface contract 270 described herein defines the requirements that selected ML model algorithms 276 are to have in order to be able receive a specific type of input from the intent identification software application 264 or any AI productivity tool-enablable software application 288 and to provide a specific type of output to the intent identification software application 264 and/or AI productivity tool-enablable software applications 288. In an embodiment, the interface contract 270 is generate by an AI productivity proxy API 268 invoked by the SDK module 266 in order to identify the specific ML model algorithm 276 (e.g., 278, 280) that provides the appropriate inputs or outputs to the intent identification software application 264 or AI productivity tool-enablable software application 288 under the interface contract 270.

By way of example, a user may provide audio input to the information handling system (via for example the microphone 256) as with this user-query input the to the AI productivity tool software chatbot application 258. The user may state, for example, "Update my drivers to the latest version." This causes the AI productivity tool software chatbot application 258 to transmit this audio user-query input to the intent identification software application 264 via the AI productivity tool software plug-in 260. The intent identification software application 264 may then call the SDK module 266 and have the AI productivity proxy API 268 to generate an interface contract 270 used to select among the plurality of ML model algorithms 276 to determine the user's intent and identify an AI productivity tool-enablable software application 288 that includes a capability that can satisfy that intent. To do this, the AI productivity proxy API 268 may access a machine learning model requesting module 272 and machine learning model loading module 274 to select the appropriate ML model algorithms 276 and load those machine learning model algorithms 276 (e.g., an ASR ML embedded algorithm 277 to identify received speech in the audio and convert to text, the query input-to-intent embedding ML model algorithm 278 to generate a query intent value, and query intent-to-capability matching ML model algorithm 280 to determine correlation with a capability intent value) to RAM for execution. At this point, the output from the executed ML model algorithm 276 may be provided to the intent identification software application 264 that includes an identified query intent (e.g., "UPDATE_ALL_DRIVERS") including an embedded vectorized query intent value, and a suggest one of the plurality of AI productivity tool-enablable software applications 288 and a capability from a capability intent value for the AI productivity tool-enablable software application 288 to satisfy the user request to update any number of drivers executing on the information handling system 200 such as with the Dell® Optimizer® software application 291 or any other AI productivity tool-enablable software application 288 that can be executed to update the drivers.

Again, the intent identification software application 264 may, concurrently, cause computer-readable program code instructions of a negated intent identification software application 286 to be executed in order to identify an undo action and a negated intent that describes a reversing action to reverse the capability intent action that was completed by an AI productivity tool software chatbot application 258, AI productivity tool subagent 262, and an AI productivity tool-enablable software application 288 selected to respond such as Dell® Optimizer® software application 291. This negated intent linked to the AI productivity capability intent action may be later used to reverse the AI productivity capability intent action. For example, the capability intent action for UPDATE_ALL_DRIVERS by Dell® Optimizer® software application 291 may have a negated intent linked to it to include "RESTORE_SYSTEM_TO_CHECKPOINT" that is a rollback of drivers and their states prior to the execution of the capability intent action by the Dell® Optimizer® software application 291. This negated intent may be maintained with the capability in the capabilities database and also stored within or linked to from a historic system state buffer 284 within a circular buffer in an example embodiment. The negated intent is associated with the capability intent action as a negated intent on a memory device, such as a static memory or drive for a capabilities database, of the information handling system 200. It is appreciated that each of the negated intents are a priori linked to each of the capability intent actions capable of being effectuated by the systems and methods described herein. Thus, when a user if the information handling system attempts to undo a capability intent action that can be negated, the negated intent may be identified (e.g., in a negation field associated with data of the capability intent action) and apply the reversing action of the negated intent.

The circular buffer of the historic system state buffer 284 may operate under a first in, first out (FIFO) logic such that the oldest negated intent stored thereon may be removed first within the circular buffer when the circular buffer is full. Thus, in an embodiment, the circular buffer may store any number of negated intents that may be used to reverse the corresponding original capability intent actions (e.g., UPDATE_ALL_DRIVERS to restore driver settings to checkpoint settings). Again, the size of the circular buffer may be relatively small due to the potential of the user to not remember all previous user-query inputs except for the most recent ones. In one embodiment, the circular buffer of the historic system state buffer 284 may store up to five system states although any number of system states are contemplated in various embodiments. In this way, if a user-query input is received that is determined to be an undo intent matching an undo action intent value for a particular capability intent action previously performed, the negated intent and associated reversing action may be called if a reversing action is possible and if the negated intent is not so old as to have been purged from the FIFO buffer in embodiments herein.

The hardware processor 202 or other hardware processing resource (e.g., embedded controller, GPU, APU, NPU) may also execute computer-readable program code instructions of a system state capture software module 282. In an embodiment, the execution of the system state capture software module 282 may generate a system state defining the state of the information handing system 200 prior to the AI productivity capability intent action being completed by the AI productivity tool-enablable software application 288. In this example embodiment, the AI productivity tool-enablable software application 288 is the Dell® Optimizer® software application 291 that, per the user-query inputs, had or will update the drivers executing on the information handling system 200 as requested by the user. However, prior to the Dell® Optimizer® software application 291 updating any drivers, the execution of the computer-readable program code instructions of the system state capture software module 282 may capture the system state prior to this change (e.g., a restore point with an associated restore point identification).

In embodiments, the data and information describing the system state prior to the capability intent action being executed may come from a variety of sources. In some embodiments herein, this data and information may include hardware or software settings, update statuses for software or firmware, or other data regarding operation of the information handling system or user in describing the system state that may be gathered from the BIOS, the OS, hardware drivers, update logs maintained on the information handling system, among other sources. It is appreciated that this data and information describing the system state may be received from other sources and the present specification contemplates these other sources.

Again, it is appreciated that during operation of the information handling system 200, the user may not like the changes made to the information handling system 200 as requested in a previous user-query input. This may be due to a realization by the user that the updated drivers have slowed processing performance, or results in software applications do not include features the user interacted with earlier, or the like. Continuing with the example presented above, the user may not appreciate the changes that the updated drivers had made to the information handling system 200 and may request the previous change to be undone in a user query input. For example, the user may, via the microphone 256, provide audio user-query input to the AI productivity tool software chatbot application 258 such as "Undo my drivers update." Similar to above, this new user-query input is received by the intent identification software application 264 from the AI productivity tool software chatbot application 258 via the AI productivity tool software plug-in 260 and the intent identification software application 264 may begin to run similar ML model algorithms 276 in order to identify the capability intent action to be carried out. However, at this point the output from the ML model algorithms 276 (e.g., query input-to-intent embedding ML model algorithm 278 and query intent-to-capability matching ML model algorithm 280) may identify an undo intent requesting a negated intent and identify a previously-executed capability intent action to a previous user-query input that was saved on the historic system state buffer 284. Thus, in an embodiment, with the subsequent user-query input requesting an undo action being used as input to the ML model algorithms 276 to determine if this new or subsequent user-query input is an undo seeking a negated intent of a previous capability intent action and identifying the previous capability intent action that was carried out earlier.

In this example embodiment, the query input "undo all updates" is used as input to the ML model algorithms 276 in order to determine an undo intent as a request and the negated intent "RESTORE SYSTEM_TO_CHECKPOINT" that is linked in a capabilities database to "UPDATE ΔLL DRIVERS" of the original capability intent action requested. In an embodiment where the user-query input includes words such as "undo," "negate," "reverse," and the like, the output from these ML model algorithms 276 will proceed to cause the intent identification software application 264 to begin to search the historic system state buffer 284 for a previously executed capability intent action requested to be undone and a system state that was associated with the capability intent action correlated to the subsequent user query input to undo. The negated intent is associated with a reversing action of the previously identified capability intent action completed via execution of the computer-readable program code of the negated intent identification software application 286. Thus, in an embodiment, each capability intent action that could be identified via execution of the intent identification software application 264 will have one or more correlating negated intent actions associated with it in order to provide a negated intent action when a user requests that a capability intent action now be undone.

At this point, the negated intent is identified with an associated previous system state that was also stored on the historic system state buffer 284 or a pointer stored there pointing to a memory location at another storage device. The intent identification software application 264 may then execute computer-readable program code instructions of an AI productivity tool-enablable software application 288 (e.g., in this example the Dell® Optimizer® software application 291) to restore the updated driver settings to previous driver settings according to the saved system state identified by the negated intent to return the drivers of the information handling system 200 to driver settings detected prior to the updating of the drivers. It is appreciated that this process may be completed for a reversing action for other types of changes made to any setting, update, characteristic, or state of the information handling system 200 by execution of a capability intent action that responded to a query input still recorded in the buffer. The present specification contemplates that the systems and methods described herein may be used by a user to initially make changes by execution of a capability intent action to a setting, characteristic, or state of the information handling system 200 and subsequently undo that change by use of a generated negated intent of that capability intent action. The systems and methods described in embodiments herein enhance a user's ability to control the capability intent actions carried out by AI productivity tool chatbot software application 258 on an information handling system 200 by minimizing effort on the part of the user to undo previously-initiated capability intent actions. Additionally, the systems and methods described in embodiments herein create a user-intuitive interaction with the AI productivity tools of the AI productivity tool chatbot software application 258 thereby allowing the user to confidently interact with the information handling system 200 assured that the user's capability intent actions are reversible, consistent, and efficient when unless such capability intent actions are irreversible, such as a delete action, or are too old and no longer in the buffer.

Figure 3:
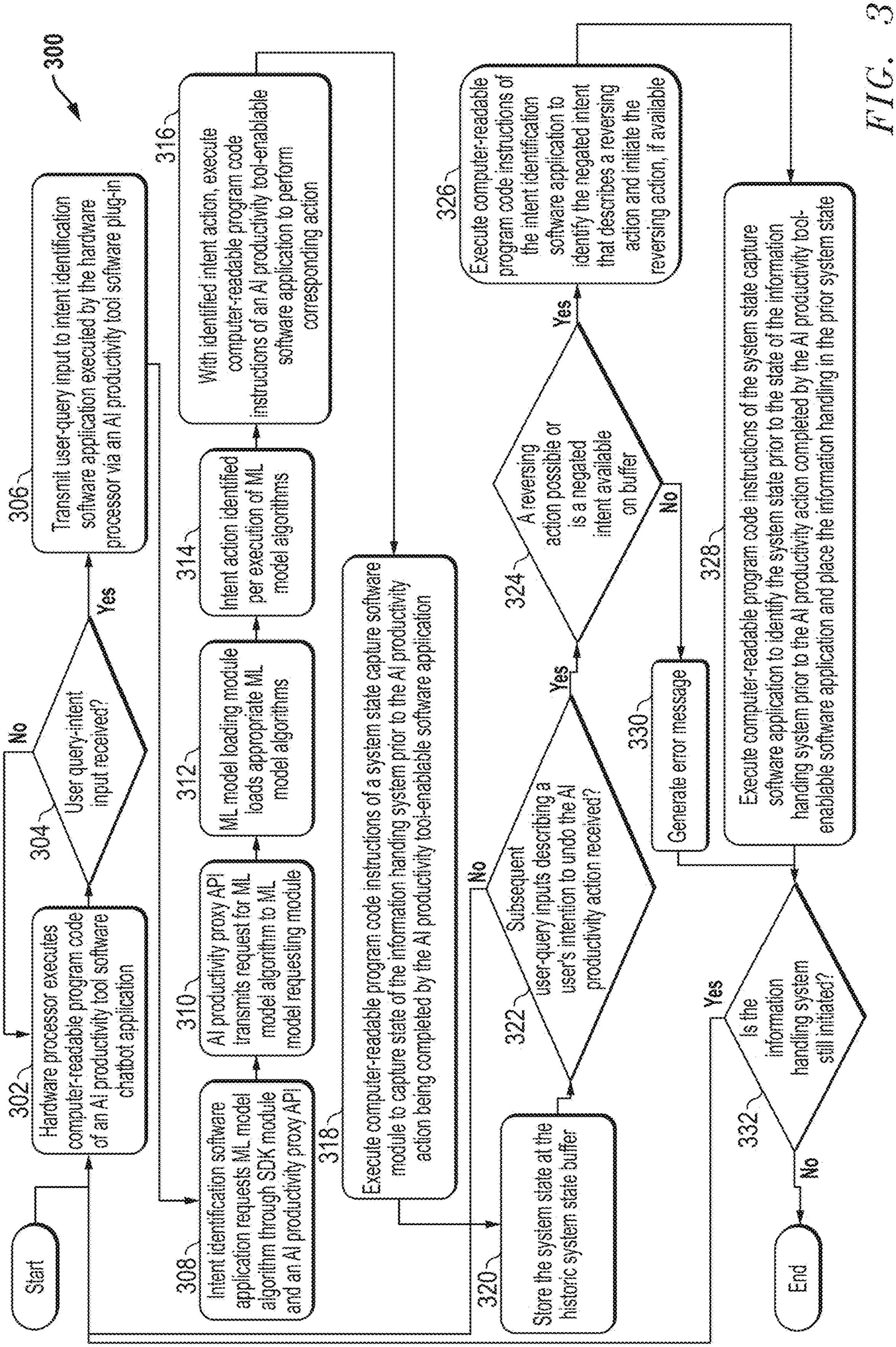
FIG. 3 is a flow diagram showing a method of executing computer-readable program code instructions for undoing AI productivity capability intent actions of an AI productivity tool chatbot software application on an information handling system according to an embodiment of the present disclosure.

FIG. 3 is a flow diagram showing a method 300 of executing computer-readable program code instructions for undoing AI capability intent actions of an AI productivity tool chatbot software application on an information handling system according to an embodiment of the present disclosure. The method 300 described in connection with FIG. 3 may be operated on an information handling system such as an information handling system (e.g., 100, 200) described in connection with FIG. 1 or 2.

The method 300 may include, at block 302, the hardware processor or other hardware processing device of the information handling system executing computer-readable program code instructions of an AI productivity tool software chatbot application. In an embodiment, the AI productivity tool software chatbot application may be any chatbot application that can receive input from a user such as text input via the keyboard or speech input via the microphone. In an embodiment, the AI productivity tool software chatbot application may include a virtual assistant-type AI software agent. In various embodiments, the hardware processor or other alternative hardware processing resources of the information handling system may execute computer-readable program code instructions of the AI productivity tool software chatbot application with its AI productivity tool software plug-in and monitor for user-query inputs at a microphone, keyboard, or other input device for the AI productivity tool subagent to engage in capability intent actions pursuant to the user-query inputs.

Where, at block 304, no user query-intent input is received, the method 300 returns to block 302 with the AI productivity tool software chatbot application continuing to monitor for this input. Where, at block 304, the AI productivity tool software chatbot application does detect and receive user-query input, the method 300 continues to block 306 with the user-query input being transmitted to an intent identification software application being executed by the hardware processor of the information handling system via an AI productivity tool software plug-in. In an embodiment, the intent identification software application may be part of an AI productivity tool subagent that provides AI productivity services with the AI productivity tool software chatbot application as described in embodiments herein.

Proceeding to block 308, the intent identification software application may request an ML model algorithm though the SDK module and an AI productivity proxy API. The intent identification software application may engage with a machine learning model requesting module to have one or more ML model algorithms loaded and executed on the hardware processor in order to, initially, process received query inputs and determine a correlated capability intent action to be conducted based on the received user-query inputs. The execution of the computer-readable program code instructions of the intent identification software application may call the SDK module. The SDK module may include any computer-readable program code instructions that is executed by the hardware processor or other hardware processing resource to request that a ML model algorithm be invoked to support processing an input query and then determine an identification of a capability intent action responsive to the received user-query inputs from a user.

At block 312, the ML model loading module loads the appropriate ML model algorithms. For example, the ML model algorithm may include a query input-to-intent ML model algorithm that receives the user-query inputs, identifies a user-query intent or description of the user-query inputs, and generates a multi-axis vector query intent value for the identified user-query intent. The ML model algorithm may also include a query intent-to-capability matching ML model algorithm that receives the generated multi-axis vector query intent value of an input query as input and matches the assigned multi-axis vector query intent value to a capability intent value associated with the AI productivity tool-enablable software application that can execute the capability intent action as identified as responsive to a query input at block 314. Execution of computer-readable program code instructions for a query intent-to-capability matching ML model algorithm may conduct a similarity comparison between a vector query intent value and a vector capability intent value to determine a statistical correlation or a closeness of vector values within a threshold deviation of those vector values in a multi-axis space. The axes represent various mathematical values related to meaning of an input query or to a description of a capability such that intent values in the multi-axis "space" may be correlated statistically relative to a meaning or intent of the user-query input as it relates to a capability description. A statistical correlation (e.g., a highest level near with an exact match of 1) or vector intent values within a threshold between the query intent value and a capability intent value indicates a capability that is responsive to a user-query input.

It is appreciated that the selected ML model algorithms satisfy an interface contract requested by the intent identification software application such that the query intent value from the user-query inputs may be generated and similarity correlation to a capability intent value for a capability associated with one of the plurality of AI productivity tool-enablable software applications can be matched to the user-query input from the user. The interface contract described herein defines the requirements that selected ML model algorithms are to have in order to be able receive a specific type of input from the intent identification software application or any AI productivity tool-enablable software application and to provide a specific type of output to the intent identification software application and/or AI productivity tool-enablable software applications. In an embodiment, the interface contract is generated by an AI productivity proxy API invoked by the SDK module in order to identify the specific ML model algorithm that provides the appropriate output to the intent identification software application.

At the point where the correlated capability intent action has been identified, the method 300 may proceed with a number of processes which may execute concurrently or in any order in various embodiments as described herein. In an embodiment, at block 316, the method 300 includes executing computer-readable program code instructions of an AI productivity tool-enablable software application to perform a corresponding capability action correlated to the received user-query input. Any number of capability intent actions may be completed based on a correlated response to any number of user-query inputs. Example user-query inputs may seek changing a brightness level of a video display device via execution of a Dell® Display and Peripheral Manager® software application, updating drivers via execution of the Dell® Optimizer® software application, pairing a Bluetooth device securely via execution of the Dell® Trusted Device® software application, facilitating a gaming mode via execution of an Alienware® Command Center (AWCC) software application, providing warranty information or providing instructions to replace hardware within the information handling system via execution of a Dell® Support Assist® software application, among other capability intent actions.

In an embodiment, the executed capability intent action may have a previously-linked negated intent associated with the capability intent action in a capabilities database. Upon completion of the executed capability intent action in response to a received user query input by an AI productivity tool enablable software application via the AI productivity tool software chatbot application, a record of the executed capability intent action is stored for later reference in a circular buffer that may hold a limited number of previously executed capability intent actions. The circular buffer may include data for a historic system state buffer, in an embodiment, may associated both the one or more executed capability intent actions and a potential negated intent along with a saved systems state. The circular buffer may, in an embodiment, operate under a FIFO logic such that the oldest negated intent stored thereon may be removed first within the circular buffer when the circular buffer is full. Thus, in an embodiment, the circular buffer may store any number of capability intent actions (e.g., a display brightness of 100% or another previous state percentage). Again, the size of the circular buffer may be relatively small due to the potential of the user to not remember all previous user-query inputs except for the most recent. In an embodiment, the circular buffer may store up to five previously executed capability intent actions although any number of stored executed capability intent actions are contemplated in embodiments herein and may depend on the size of a first in first out (FIFO) buffer used.

At block 318, the method 300 further includes executing computer-readable program code instructions of a system state capture software module to capture state of the information handing system prior to the capability intent action being completed by the AI productivity tool-enablable software application. Again, the data and information describing the system state prior to the capability intent action being executed may be state data such as hardware or software settings, update statues or other state data that comes from a variety of sources. In some embodiments herein, this data and information describing the system state may be gathered from the BIOS, the OS, hardware drivers, update logs maintained on the information handling system, among other sources for a state of relevant settings prior to execution of a requested capability intent action of the AI productivity tool chatbot software application. It is appreciated that this data and information describing the system state may be received from other sources and the present specification contemplates these other sources. For example, the BIOS may provide data describing settings associated with each driver executable on the information handling system from the BIOS prior to any updates being made to any of the drivers via a user-query input as described in embodiments herein.

These system states may each be stored on the historic system state buffer of the circular buffer at block 320 for later use as described herein. In an embodiment, each of the system states captured may be associated with their respective negated intent stored in the historic system state buffer or a pointer may be stored in the buffer that points to a memory location to a solid-state drive (SSD) or other memory device to store the state information. In an example embodiment, if a negated intent is deleted from the circular buffer due to the FIFO logic, its associated stored system state may also be deleted.

At block 322, the method 300 includes determining if any subsequent user-query inputs describing a user's intention to undo any of the previously-executed capability intent actions are received. Where no user-query input that describes a request to undo any previous AI productivity capability intent action is received, the method 300 proceeds to block 302 to monitor for any further user-query input that define a user's request to perform another capability intent action at the information handling system. Where, however, the AI productivity tool software chatbot application has received and the intent identification software application processes and identifies that a user-query input describes a user's intent to undo any previous AI productivity capability intent action, the method continues to block 324.

At block 324 the method 300 further includes determining if a reversing action possible or is a negated intent available on the buffer. As described herein, some capability intent actions may not be undone once completed due to, in an example embodiment, it being impossible to undo the capability intent action. In some embodiments, the user-query intent reversing actions cannot be completed due to their nature. For example, if a user was to request at the AI productivity tool chatbot software application that a file be permanently deleted (e.g., "permanently delete [filename]") and a capability intent action executes to permanently delete that file even from a recycle bin or other storage location for deleted files, a negated intent may be unable to be created to reverse this capability intent action since it is not capable of being undone. In another example embodiment of a user-query input that cannot be completed due to a its nature would include a request for information from the user such as "what is my service tag?" or "how much time is left on my warranty?" These two examples cannot be negated because they are inherently "ineffective" operations that do not result in a change to the information handling system. In such a cases, a negated intent will not be associated with such a capability but instead an indication that the capability or any capability intent actions performed cannot be undone will be associated with the capability or the executed capability intent action.

Additionally, because the circular buffer was operating using FIFO logic, in an example embodiment, some previously executed capability intent actions or system states may be dropped or deleted to make room on the circular buffer for later capability intent actions with newer-generated system states. In such a case, no executed capability intent action or system state is available anymore on the buffer and an undo action and negated intent cannot be used to identify such a previous system state.

At block 324, where it is determined a negated intent is possible and that there is a previous system state identified and available on the circular buffer, the method 300 proceeds to block 326. Where no negated intent and associated reversing action is possible at block 324, the method proceeds to block 330.

At block 330, a user may be provided with a notification on, for example, a graphical user interface, via an audio speaker output with a tone or audio message, or other indicator indicating that the capability intent action responsive to a received user-query input cannot be undone and that a reversing action will not be executed because that action cannot be undone. The error message may indicate to a user, via a graphical user interface on a video display device or response generated on an audio speaker such as a tone or error message, that the negated intent reversing action cannot be executed. The error message may also indicate to the user as to why the negated intent reversing action cannot be executed by an AI productivity tool-enablable software application in an embodiment, such as it is not possible to undo such a capability intent action or the undo request is too old. After generating the error message, the method 300 may continue to block 332 as described below.

Returning to block 326, whatever the capability intent action that has been taken on behalf of the user based on the user-query input at block 316, the hardware processor executing computer-readable program code instructions of a negated intent identification software application may identify a negated intent that is linked to the original executed capability intent action. As described herein, the negated intent describes a reversing action that may be completed to reverse the initiated capability intent action. For example, where the original capability intent action was "SET_DISPLAY_BRIGHTNESS TO PERCENTAGE," a negated intent may also be "SET_DISPLAY_BRIGHTNESS TO_PERCENTAGE" where the specific "brightness" is a prior brightness percentage before the capability intent action was executed. It is appreciated that, in this example, the descriptive intent for the capability intent action and the negated intent are the same. However, the negated intent now correlates with a previous display brightness setting to fill in a value for "PERCENTAGE" as an argument in the form of a captured state of the information handling system, and in particular the state of a display device brightness setting, generated prior to the capability intent action being complete. In another example, an action intent may include "UPDATE_ALL_DRIVERS" with a negated intent identified via execution of the computer-readable program code instructions of the negated intent identification software application including "RESTORE_SYSTEM_TO_CHECKPOINT" that is descriptive of a rollback of drivers and their states prior to the execution of the capability intent action. As described in some embodiments herein, data and information describing the system state prior to the query intent action being executed may be data for hardware setting statuses, update revisions for software or firmware, software settings statuses or other state data gathered from the BIOS, the OS, hardware drivers, such as update logs maintained on the information handling system, among other sources. For example, this creates a "checkpoint" where the settings of the drivers for hardware or software settings are identified and data describing these settings is saved for later negating intent actions if applicable.

The method 300 further includes executing computer-readable program code instructions of the system state capture software application to identify the system state of the information handing system prior to execution of the AI productivity capability intent action completed by the AI productivity tool-enablable software application to enable placing the information handling in the correct prior system state at block 328. Because the system state was associated with the executed capability intent and its linked negated intent within the historic system state buffer, the appropriate prior system state to be used may be easily identified. For example, a previous brightness percentage may have been recorded or a update state for update revision history may be recorded in example embodiments discussed herein. With the identified appropriate system state, the information handling system may execute one or more AI productivity tool-enablable software applications to return the information handling system to the system state prior to the AI productivity capability intent action being completed that was based on the original user-query input.

At block 332, the method 300 also includes determining whether the information handling system is still initiated. Where it is determined that the information handling system is still initiated, the method proceeds to block 302 so that other user-query input may be received, and capability intent actions can be completed as described herein. Where it is determined, at block 332, that the information handling system is no longer initiated, the method 300 may end here.

The systems and methods described herein enhances a user's ability to control the actions carried out by AI productivity tools on an information handling system by minimizing effort on the part of the user to undo previously-initiated actions. Additionally, the systems and methods described herein and creates a user-intuitive interaction with the AI productivity tools thereby allowing the user to confidently interact with the information handling system assured that the user's actions are reversible, consistent, and efficient.

The blocks of the flow diagrams of FIG. 3 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system to undo capability intent actions of an artificial intelligence (AI) productivity tool chatbot software application comprising:

a hardware processor to execute computer-readable program code instructions of a software development kit module to initiate a request, on behalf of the AI productivity tool chatbot software application being executed on the information handling system, for a machine learning (ML) model algorithm to process a first user-query input received from a user and correlate the first user-query input to a capability intent action;

the hardware processor to execute computer-readable program code instructions of an intent identification software module to correlate the capability intent action with the first user-query inputs by invoking the ML model algorithm to convert the first user-query input into a query intent value for the first user-query input and correlate the query intent value to a capability to be executed by an AI productivity tool-enablable software application;

the hardware processor to execute computer-readable program code instructions of the AI productivity tool-enablable software application to initiate the capability intent action based on the correlated capability;

the hardware processor to execute computer-readable program code instructions of a negated intent identification software application to identify a negated intent associated with the capability intent action that describes a reversing action that may be executed to reverse the capability intent action correlated to the first user-query input; and the hardware processor to execute computer-readable program code instructions of a system state capture software module to generate a system state defining a state of the information handing system prior to the capability intent action being executed by the AI productivity tool-enablable software application.

2. The information handling system of claim 1 further comprising:

the hardware processor to execute computer-readable program code instructions of the intent identification software module to receive a second user-query input describing a user's intention to undo the capability intent action responsive to the first user query input and direct the negated intent identification software application to identify the negated intent that describes the reversing action; and the hardware processor to initiate the reversing action.

3. The information handling system of claim 2 further comprising:

the hardware processor to execute computer-readable program code instructions of the intent identification software module to identify user's intent to undo the capability intent action with the negated intent that describes the reversing action by correlation of a second embedded query intent vector value with an undo capability intent value for the AI productivity tool-enablable software application.

4. The information handling system of claim 1, wherein the ML model algorithm comprises a query input-to-intent ML model algorithm that receives the first user-query input and generates the query intent value that is a multi-axis vector query intent value for the first user-query.

5. The information handling system of claim 1, wherein the ML model algorithm includes a query intent-to-capability matching ML model algorithm to receive the query intent value as input generated from the first user-query input and correlate the query intent value to a capability intent value associated with the capability of AI productivity tool-enablable software application that can serve as the capability intent action responsive to the first user-query input.

6. The information handling system of claim 1 further comprising:

the hardware processor to execute computer-readable program code instructions of the intent identification software module to access the negated intent generated for the capability intent action when a negating user-query input is detected by the execution of the computer readable program code of the AI productivity tool chatbot software application.

7. The information handling system of claim 1 further comprising:

the hardware processor to execute computer-readable program code instructions of a negated intent identification software application to access the negated intent stored in a database and linked to the capability intent action identified as part of a second user-query input describing a user's intention to undo the capability intent action.

8. The information handling system of claim 7, wherein an historic system state buffer is a circular buffer and wherein the circular buffer operates first in, first out (FIFO) logic to remove the oldest negated intents first within the circular buffer when the circular buffer is full.

9. A method of undoing capability intent actions of an artificial intelligence (AI) productivity tool-enable software application on an information handling system comprising:

executing computer-readable program code instructions of a software development kit module to initiate a request with a hardware processor, on behalf of an AI productivity tool chatbot software application being executed on the information handling system, for a machine learning (ML) model algorithm to identify a capability intent action based on a first user-query input received from a user by correlating the first user-query input to the capability intent action;

executing computer-readable program code instructions of an intent identification software module with the hardware processor to correlate the capability intent action with the first user-query input by invoking the ML model algorithm to generate a first query intent value from the first user-query input and correlate the first query intent value to a capability executable by an AI productivity tool-enablable software application having a capability intent value;

executing computer-readable program code instructions of the AI productivity tool-enablable software application with the hardware processor to initiate the capability intent action of the correlated capability;

executing computer-readable program code instructions of a negated intent identification software application with the hardware processor to identify a negated intent that describes a reversing action to be executed to reverse the capability intent action correlated to the first user-query input; and executing computer-readable program code instructions of a system state capture software module with the hardware processor to generate a system state defining a state of the information handing system prior to the capability intent action being executed by the AI productivity tool-enablable software application.

10. The method of claim 9 further comprising:

executing computer-readable program code instructions of the intent identification software module with the hardware processor to receive a second user-query input describing a user's intention to undo the capability intent action responsive to the first user-query input and direct the negated intent identification software application to identify the negated intent that describes the reversing action corresponding to the capability intent action; and executing computer-readable program code instructions of the reversing action.

11. The method of claim 10 further comprising:

executing computer-readable program code instructions of the system state capture software module with the hardware processor to identify the system state of the information handing system prior to the execution of the capability intent action by the AI productivity tool-enablable software application; and execute the reversing action to place the information handling in the system state of the information handling system prior to execution of the capability intent action.

12. The method of claim 10, wherein the ML model algorithm includes a query intent-to-capability matching ML model algorithm to receive a second query intent value generated for the second user-query input and match the second query intent value to a second vector capability intent value associated with an undo intent and the capability of the AI productivity tool-enablable software application to execute the reversing action.

13. The method of claim 9 further comprising:

executing computer-readable program code instructions of the intent identification software module with the hardware processor to determine whether the capability intent action executable pursuant to the first user-query input is not reversible; and presenting to the user a notification on a graphical user interface of a video display device indicating that the capability intent action cannot be undone and that a reversing action cannot be executed when a second user-query input describing a user's intention to undo the capability intent action responsive to the first user query input is received.

14. The method of claim 9 further comprising:

executing computer-readable program code instructions of the intent identification software module with the hardware processor to access a generated negated intent when a second user-query input is detected by the execution of the computer readable program code of the intent identification software module for an undo intent.

15. The method of claim 9 further comprising:

executing computer-readable program code instructions of the intent identification software module with the hardware processor to receive a second user-query input describing a user's intention to undo the capability intent action responsive to the first user-query input and direct the negated intent identification software application to identify the capability intent action in a historic system state buffer that is a first-in first out (FIFO) buffer and the negated intent that describes the reversing action corresponding to the capability intent action.

16. The method of claim 9 further comprising:

executing computer-readable program code instructions of the system state capture software module to generate the system state defining the state of the information handing system prior to the capability intent action being completed by the AI productivity tool-enablable software application, wherein the system state is generated from data for hardware setting status obtained from a basic input/output system (BIOS) or an operating system (OS) of the information handling system.

17. An information handling system to undo capability intent actions from an artificial intelligence (AI) productivity tool chatbot software application comprising:

a hardware processor executing computer-readable program code instructions to initiate requests, on behalf of the AI productivity tool chatbot software application being executed on the information handling system, for a machine learning (ML) model algorithm to identify a plurality of capability intent actions based on a plurality of received user-query inputs from a user;

the hardware processor to execute computer-readable program code instructions of an intent identification software module to correlate capability intent actions with each of the user-query inputs by invoking the ML model algorithm to convert each user-query input into a query intent value and match each query intent value to a capability to be executed by an AI productivity tool-enablable software application as each of the capability intent actions;

the hardware processor to execute computer-readable program code instructions of the one or more AI productivity tool-enablable software applications to initiate each of the capability intent actions based on the matched capability;

the hardware processor to execute computer-readable program code instructions of a negated intent identification software application to identify a negated intent that describes a reversing action for each of the plurality of capability intent actions that may be completed to reverse each of the plurality of capability intent actions;

the hardware processor to execute computer-readable program code instructions of a system state capture software module to generate a plurality of system states each defining a state of the information handing system prior to execution of a corresponding capability intent action of the plurality of capability intent actions by the one or more AI productivity tool-enablable software applications; and the hardware processor to execute computer-readable program code instructions of the intent identification software module to receive a subsequent user-query input describing a user's intention to undo a first capability intent action from the plurality of capability intent actions; and the hardware processor to execute the negated intent identification software application to identify a first negated intent corresponding to the first capability intent action that describes a first reversing action and initiate the first reversing action.

18. The information handling system of claim 17 further comprising:

the hardware processor to execute computer-readable program code instructions of the system state capture software module to identify a first system state of the information handing system prior to execution of the first capability intent action by the AI productivity tool-enablable software application; and the hardware processor executing the first reversing action pursuant to the first negated intent to place the information handling system in the first system state of the information handling system prior to execution of the first capability intent action.

19. The information handling system of claim 17 further comprising:

the hardware processor to execute computer-readable program code instructions of the intent identification software module to receive a second user-query input describing a user's intention to undo the capability intent action responsive to a first user query input and direct the negated intent identification software application to identify the first capability intent action among the plurality of capability intent actions in a historic system state buffer, wherein the historic system state buffer is a circular buffer and wherein the circular buffer operates first in, first out (FIFO) logic to remove an oldest of the plurality of negated intents first from the circular buffer when the circular buffer is full; and the hardware processor to execute computer-readable program code instructions of a negated intent identification software application to identify the first negated intent linked to the first capability intent action.

20. The information handling system of claim 17 further comprising:

the hardware processor to execute computer-readable program code instructions of the system state capture software module to store the plurality of system states and corresponding negated intents on a circular buffer prior to the AI productivity tool-enablable software application executing each of the capability intent actions.

* * * * *